(12) United States Patent
Peng (10) Patent No.: US 9,729,053 B2
(45) Date of Patent: Aug. 8, 2017

(54) LIGHT-LOAD CONTROL DEVICE, LIGHT-LOAD CONTROL METHOD, AND VOLTAGE CONVERTER

(71) Applicant: SKYWORKS SOLUTIONS, INC., Woburn, MA (US)

(72) Inventor: Tao Peng, Shanghai (CN)

(73) Assignee: Skyworks Solutions, Inc., Woburn, MA (US)

( * ) Notice: Subject to any disclaimer, the term of this patent is extended or adjusted under 35 U.S.C. 154(b) by 79 days.

(21) Appl. No.: 14/291,400

(22) Filed: May 30, 2014

(65) Prior Publication Data

US 2015/0349635 A1    Dec. 3, 2015

(51) Int. Cl.
    *H02M 3/158*    (2006.01)
    *H02M 1/00*     (2006.01)

(52) U.S. Cl.
    CPC .... *H02M 3/158* (2013.01); *H02M 2001/0032* (2013.01); *Y02B 70/16* (2013.01)

(58) Field of Classification Search
    CPC ........... H02M 2001/0032; H02M 1/08; H02M 2001/0025; H02M 2001/0035; H02M 3/1588; H02M 3/156; H02M 3/33507
    See application file for complete search history.

(56) References Cited

U.S. PATENT DOCUMENTS

| | | | | |
|---|---|---|---|---|
| 8,080,987 B1 * | 12/2011 | Qiu | ........................ | H02M 3/156 323/284 |
| 2006/0087303 A1 * | 4/2006 | Hartular | ................ | H02M 3/156 323/283 |

* cited by examiner

*Primary Examiner* — Adolf Berhane
*Assistant Examiner* — Henry Lee, III
(74) *Attorney, Agent, or Firm* — Chang & Hale LLP (57) ABSTRACT

Light-load control devices and methods implemented in applications such as voltage converters. In some embodiments, a control system for a voltage converter can be configured to determine whether the voltage converter is in a first load state such as a light-load state. The control system can be further configured to generate a first driving signal when the voltage converter is in the light-load state. The control system can be further configured to route the first driving signal to a control element of the voltage converter when the voltage converter is in the light-load state, and to route a second driving signal to the control element when the voltage converter is in a second load state such as a heavier-load state. Such a control system can yield reduced power consumption of the control element when the voltage converter is in the light-load state.

13 Claims, 6 Drawing Sheets

FIG.9

LIGHT-LOAD CONTROL DEVICE, LIGHT-LOAD CONTROL METHOD, AND VOLTAGE CONVERTER

TECHNICAL FIELD

The present application relates to electronic technology field, and more particularly, to a light-load control device, light-load control method and a voltage converter.

BACKGROUND

An electronic apparatus is generally equipped with a power supply having a specific voltage, e.g., a battery in the electronic apparatus is able to supply voltages of 3.9-4.5V. However, various modules of the electronic apparatus require different supply voltages, e.g., an analog power amplifier may request a power voltage of 3.5V, and a digital processing module may require different power voltages such as 1.8 v and 5V. In order to ensure normal operations of the various modules in the electronic apparatus, a voltage converter is typically required to convert a direct current (DC) voltage level (e.g., a voltage from the battery) to another different DC voltage required by the various modules, namely, to convert a specific input voltage Vin to a different output voltage Vout.

In an existing voltage converter, for example, electric energy at the input end is temporarily stored in an inductor and/or a capacitor (i.e., performing a charging process), and then released at the output end at different voltages (i.e., performing a discharging process), thereby the input voltage Vin is converted to a required output voltage Vout. The charging process and discharging process are controlled by a control element (such as a switch), which is driven by a driving signal. As an example, the charging process corresponds to a conducting time when the driving switch is turned on for charging, and the discharging process corresponds to an open time when the driving switch is turned off for discharging. The conducting time corresponds to a pulse width of the driving signal.

Although an ideal voltage output of the voltage converter is a DC voltage, the charging and discharging processes therein result in a subtle fluctuation in the actual output voltage, which is shown in the frequency domain where the output voltage is not an ideal zero frequency component but possesses different frequency components. However, when a electronic module powered by the voltage converter includes a radio frequency circuit used for transmitting a radio frequency signal, the output voltage of the voltage converter may disturb the radio frequency signal if the frequency component in the output voltage of the voltage converter is approximate to the frequency of the radio frequency signal. Therefore, when a load of the voltage converter is an electronic module having a radio frequency circuit, it is desirable to control the signal component (or noise component) capable of disturbing the load in the output voltage of the voltage converter. In other words, the voltage converter is under a low-noise mode through controlling the noise in the output voltage of the voltage converter.

In a voltage converter under low-noise mode, the driving signal of the control element therein can be controlled for reducing the noise component in the output voltage of the voltage converter, so that the control element is relatively smoothly switched from on to off, and/or switched from off to on. For example, the driving signal of the control element can be controlled to improve a cut-off voltage of a triode serving as a control element. When the load (e.g., the resistance of the electronic module) powered by the voltage converter is heavy, the low-noise characteristic of the voltage converter can supply power for the electronic module without disturbing the radio frequency signal of the electronic module as far as possible. However, when the load powered by the voltage converter under the low-noise mode is light and even zero, current flow can still appear on the control element, thereby causing unnecessary power consumption. Therefore, it is desirable to reduce the static current when the voltage converter under the low-noise mode has light load.

SUMMARY

Various aspects of the present application may relate to a light-load control device applied to a voltage converter; a light-load control method applied to the voltage converter; the voltage converter; an electronic module including this voltage converter, and electronic apparatus, etc.

A light-load control device of the present application can be applied to a voltage converter, where the voltage converter has a control element, which is able to control the charging and discharging of the voltage converting circuit by being driven by a specific driving signal, so as to convert an input voltage Vin to an output voltage Vout, where the specific driving signal is generated by adjusting a basic driving signal of the control element, and the voltage converter can stop working temporarily (e.g., stop charging and discharging) under the control of the control element when the powered load is under the light-load state.

A light-load control device of the present application includes: a determining unit, for determining whether the voltage converter is under light-load state, and generating a discontinuous conduction signal indicating whether the voltage converter is disabled when the voltage converter is under the light-load state; a light-load driving unit, which is capable of generating a light-load driving signal on the basis of a basic driving signal of the control element, the light-load driving signal being capable of reducing power consumption of the voltage converter in the light-load state; a switching unit, for providing the basic driving signal to the light-load driving unit when the discontinuous conduction signal indicates that the voltage converter is disabled, and driving the control element by use of the light-load driving signal instead of the specific driving signal. When the discontinuous conduction signal indicates that the voltage converter is enabled, the switching unit carries out the switching and drives the control element by using the driving signal, instead of using the light-load driving signal.

In a technical solution of the present application, when the voltage converter is under the light-load state, the specific driving signal of the control element can be replaced with the light-load driving signal to reduce the power consumption in the control element, thereby optimizing a performance of the voltage converter by using a proper driving signal according to the load of the voltage converter.

BRIEF DESCRIPTION OF THE DRAWINGS

In order to illustrate the technical solution more clearly, the drawings provided for description of the embodiments or the prior art shall be briefly explained as follows. The drawings in the following description are merely some embodiments of the present application, from which one ordinarily skilled in the art still can obtain other drawings.

Throughout respective drawings, same reference signs typically denote same components.

DETAILED DESCRIPTION

A voltage converter involved in the present application may be a boost converter, a buck converter, a boost-buck converter, etc. The voltage converter is used for converting the power voltage into voltages utilized by various electronic modules in an electronic apparatus; the electronic modules can be, for example, a radio frequency amplifier, a display, etc. The electronic apparatus including the electronic modules can be, for example, a mobile phone, a tablet computer, a display, an eBook reader, a portable digital media display, and the like. Type of the voltage converter, the powered electronic module, and the electronic apparatus applied thereto do not constitute a limitation to the present application.

Figure 1:
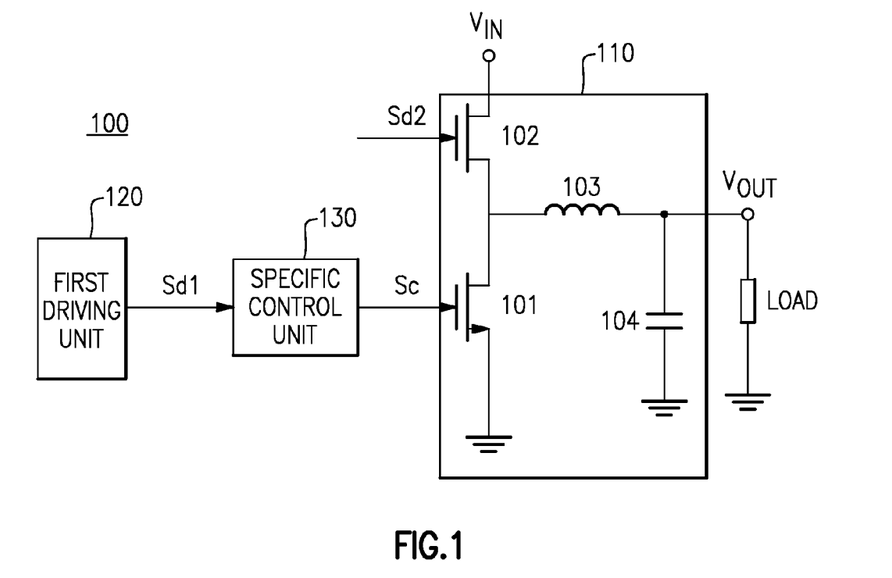
FIG. 1 is a schematic diagram which illustrates a voltage converter to which a light-load driving device of the present application is applied.

FIG. 1 is a schematic diagram which illustrates a voltage converter to which a light-load driving device of the present application is applied. The voltage converter 100 shown in FIG. 1 converts the input voltage Vin to the output voltage Vout, and the output voltage Vout can supply power to a load. The voltage converter 100 may comprise a control element, such as a triode in FIG. 1. A specific driving signal for driving the control element is generated by adjusting a basic driving signal of the control element, which operates upon being driven by the specific driving signal so that the output voltage Vout has a specific performance.

As shown in FIG. 1, the voltage converter 100 includes a voltage converting circuit 110, which comprises a control element which controls the charging and discharging operations of the voltage converting circuit 100 upon being driven by a specific control signal Sc; a first driving unit 120, for generating a first basic driving signal Sd1, wherein the first basic driving signal Sd1 drives the control element to perform a basic control operation; a specific control unit 130, for adjusting the first basic driving signal from the first driving unit 120 so as to generate a specific driving signal, wherein the specific driving signal is used for driving the control element so that the voltage converter has the specific performance.

The voltage converting circuit 110 in FIG. 1 is a buck converting circuit; the control element driven by the specific control signal Sc is the triode 101 in FIG. 1. The triode 101 is an element related to the technical solution of the present application, and it is described in the example context where only the power consumption of the triode 101 needs to be controlled when the voltage converter is under the light-load state.

In addition to the triode 101, the voltage converting circuit 110 may further include other control elements, such as a triode 102 in FIG. 1, which is connected between a port of the input voltage Vin and the triode 101 and cooperates with the triode 101 to control the charging and discharging operations of the voltage converting circuit 110. In a case where the triode 101 is a NMOS transistor and the triode 102 is a PMOS transistor, the driving signal for the triode 102 (namely, a second basic driving signal Sd2) can be the same as the first basic driving signal Sd1 from the first driving unit 120; in a case where the triode 101 and the triode 102 are transistors of same type (such as the NMOS transistor or the PMOS transistor), the second basic driving signal Sd2 of the triode 102 can be obtained by reversing the first basic driving signal Sd1. As described above, the control element of the voltage converter further includes the triode 102. In other embodiments, the triode 102 may need to be controlled to achieve the above or other specific performances of the voltage converter; correspondingly, the triode 102 can be controlled by using another specific control unit, and the another specific control unit can adjust the second basic driving signal Sd2 so as to generate another specific driving signal applied to the triode 102.

In addition to the triodes 101 and 102, the voltage converting circuit 110 further includes: an inductor 103 having a first end which is located at a joint of the triodes 101 and 102, and a second end which is connected to a port of the output voltage Vout; a capacitor 104 having a first end which is connected to the second end of the inductor 103, and a second end which is grounded to facilitate a stable output of the output voltage Vout.

During the charging process, the triode 101 is turned off and the triode 102 is turned on, and the inductor 103 is charged to generate inductive current; since the input voltage Vin is direct current, the inductive current on the inductor 103 linearly increases at a certain rate; correspondingly, current flows through both ends of the load, thereby having the output voltage. During the discharging process, the triode 101 is turned on while the triode 102 is turned off; due to the holding property of the inductive current, the current flowing through the inductor 103 slowly decreases from a value when the charging process is finished until the next charging process starts or the current value declines to 0; correspondingly, the inductor L starts to charge the capacitor C, thereby maintaining the output voltage Vout.

The voltage converting circuit 110 in FIG. 1 is a buck converting circuit, and it can be a boost converting circuit or a boost-buck converting circuit. The boost converting circuit is provided with the control elements which are similar to the triodes 101 and 102, and the boost-buck converting circuit may have a greater number of control elements.

The first driving unit 120 in FIG. 1 generates the first basic driving signal Sd1, and the first basic driving signal Sd1 drives the control element to perform a basic control operation. For example, the output voltage Vout and a reference voltage (which corresponds to an expected output voltage) are compared by an error amplifier in the voltage converter 100; the first driving unit 120 generates the first basic driving signal Sd1 for controlling the turning-on time and cut-off time of the triode 101 based on the comparison result of the error amplifier. For example, when the first basic driving signal Sd1 is at a low level (e.g., zero), the triode 101 is controlled to be turned off; when the first basic driving signal Sd1 is at a high level (e.g., 4V), the triode 101 is controlled to be turned on. As an example, the first driving unit 120 can be a driving unit of pulse width modulation (PWM), a driving unit of pulse frequency modulation (PFM), etc., which may be achieved by using any existing or future technology; and the specific implementing way will not limit the embodiment of the present application.

As described above, the second basic driving signal Sd2 in the buck converter can be the same as the first basic driving signal Sd1 or obtained through performing reverse phase on the first basic driving signal Sd1 depending on the types of triodes 101 and 102. Alternatively, the first driving unit 120 can further generate basic driving signals applied to the triodes 101 and 102, respectively; or the first driving unit 120 only generates the first basic driving signal Sd1 applied to the triode 101, and generates the second basic driving signal Sd2 applied to the triode 102 by using other driving unit.

The specific control unit 130 adjusts the first basic driving signal Sd1 from the first driving unit 120 to generate a specific driving signal Sc, and the specific driving signal Sc is used for driving the control element so that the voltage converting circuit 110 has specific performance. Generally, the first basic driving signal Sd1 can drive the control element such as the triode 101 so that the voltage converter 100 can perform voltage conversion. However, the electronic module (i.e., load) powered by the voltage converter 100 may have different demands. For example, when the electronic module is provided with a radio frequency circuit for transmitting a radio frequency signal, it is required or desirable to reduce the radio frequency component in the output voltage Vout of the voltage converter 100, and the radio frequency component is typically noise for the radio frequency signal in the radio frequency circuit. Some electronic modules require high power stability, and it is desired that the output voltage in the voltage converter 100 has small wave, etc. The specific driving signal can be generated by adjusting or additionally processing the first basic driving signal Sd1, and the first basic driving signal Sd1 can be adjusted by the specific control unit 130, thereby meeting different demands of different electronic modules.

Figure 2:
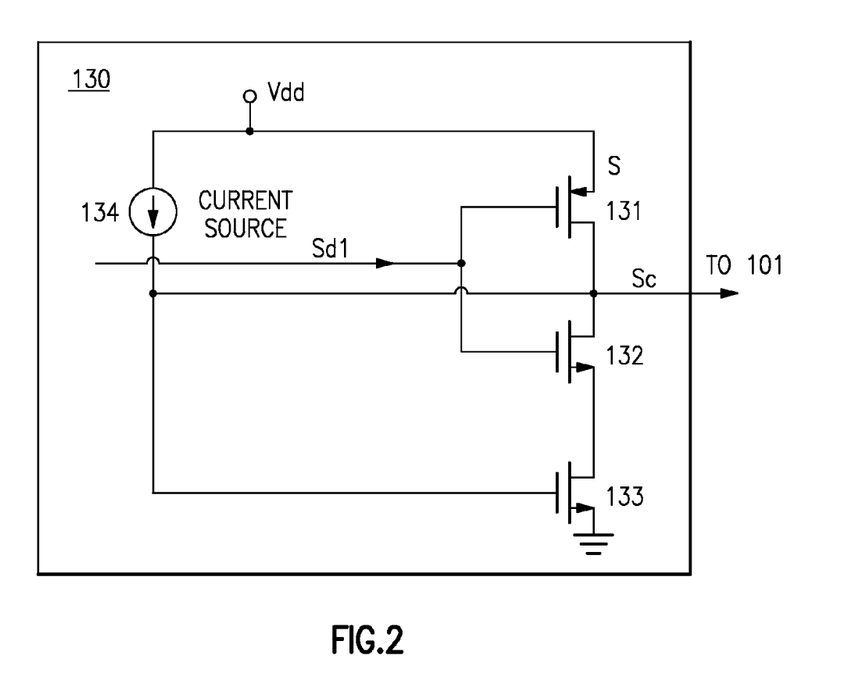
FIG. 2 schematically illustrates a circuit diagram of a specific control unit being a low-noise control unit in FIG. 1.

With reference now to FIG. 2, a schematic implementation where the specific control unit is a low-noise control unit is described, wherein the low-noise control unit can reduce the noise in the output voltage Vout of the voltage converter 100. The low-noise control unit processes the first basic driving signal Sd1 to generate the specific driving signal, which is low-noise control signal Sln, and the low-noise control signal Sln drives the control element so that the output voltage Vout has low noise.

FIG. 2 schematically illustrates a circuit diagram of a specific control unit being a low-noise control unit in FIG. 1. As an example, when the low-noise control signal Sln of the low-noise control unit is at high level, the triode 101 (e.g., the control element in the voltage converting circuit) is driven to be turned on; when it is at low level, the triode 101 is driven to be turned off, and it switches between high level and low level to facilitate driving of the triode 101. Compared with the first basic driving signal Sd1, the low-noise control signal Sln of the low-noise control unit increases the low level voltage of the first basic driving signal Sd1, so that the switch between the high level and the low level is smoother, thereby reducing the radio frequency component in the output voltage.

As shown in FIG. 2, the low-noise control unit comprises triodes 131, 132, 133 and current source 134. The triode 131 is a PMOS transistor; triodes 132 and 133 are NMOS transistors. A source electrode of the triode 131 is connected to an input end of the current source 134, a gate electrode and a drain electrode of the triode 131 are respectively connected to a gate electrode and a drain electrode of the triode 132; a source electrode of the triode 132 is connected to a drain electrode of the triode 133, and a gate electrode of the triode 133 is connected to an output end of the current source 134; a source electrode of the triode 133 is grounded, and the current source 134 is connected to a power voltage Vdd to operate; the power voltage Vdd can be, for example, the input voltage Vin of the voltage converter. The output end of the current source 134 is connected with the drain electrode of the triode 131 through a lead. Alternatively, the output end of the current source 134 is connected with the drain electrode of the triode 133 through a resistor.

FIG. 2 shows that when the first basic driving signal Sd1 is at low level, the triode 131 is turned on while the triode 132 is turned off, and voltage of the low-noise driving signal Sln output by the low-noise control unit is equal to the power voltage Vdd, and is at high level; when the first basic driving signal Sd1 is at high level, the triode 131 is turned off while the triode 132 is turned on; the triode 133, the current source 134, and the triode 101 in the voltage converting unit 110 form a mirror current source, so that a voltage level greater than zero is formed at the drain electrode end of the triode 133, namely, the low-noise driving signal is at low level. The low level of the low-noise driving signal Sln is greater than zero but less than a threshold voltage of the triode 101 in the voltage converting circuit 110, thereby increasing the low level voltage of the low-noise driving signal. That is to say, when the basic driving signal Sd1 is at low level, the low-noise control unit outputs a low-noise driving signal having high level; when the basic driving signal Sd1 is at high level, the low-noise control unit outputs a low-noise driving signal having low level. The low level is increased to be greater than zero.

The implementation of the low-noise control unit depicted in FIG. 2 is only schematic, and it can be implemented by adopting other circuits in practice. Alternatively, the low-noise control unit can reduce noise by decreasing the voltage at high level; correspondingly, the circuit of the low-noise control unit also will change.

When the load powered by the voltage converter 100 is more than a predetermined value and it is a medium or heavy load, the voltage converter 100 shown in FIG. 1 will perform the charging and discharging operations continuously so as to output an output voltage with low noise. However, when the load powered by the voltage converter 100 is less than the predetermined value and it is a light load and even zero load (namely, in light-load state), the voltage converter 100 may pause the charging and discharging operations on the principle of energy conservation, at this moment, the triodes 101 and 102 in the buck converting unit are turned off. When the triode 101 is turned off, current still exists in the triode 101 since the low-voltage driving signal output from the specific control unit 130 may not be zero, thereby consuming power unnecessarily. It should be noted that, in different voltage converters, the judging condition of light-load state thereof will also change, namely, the predetermined value may change between different voltage converters.

Figure 3:
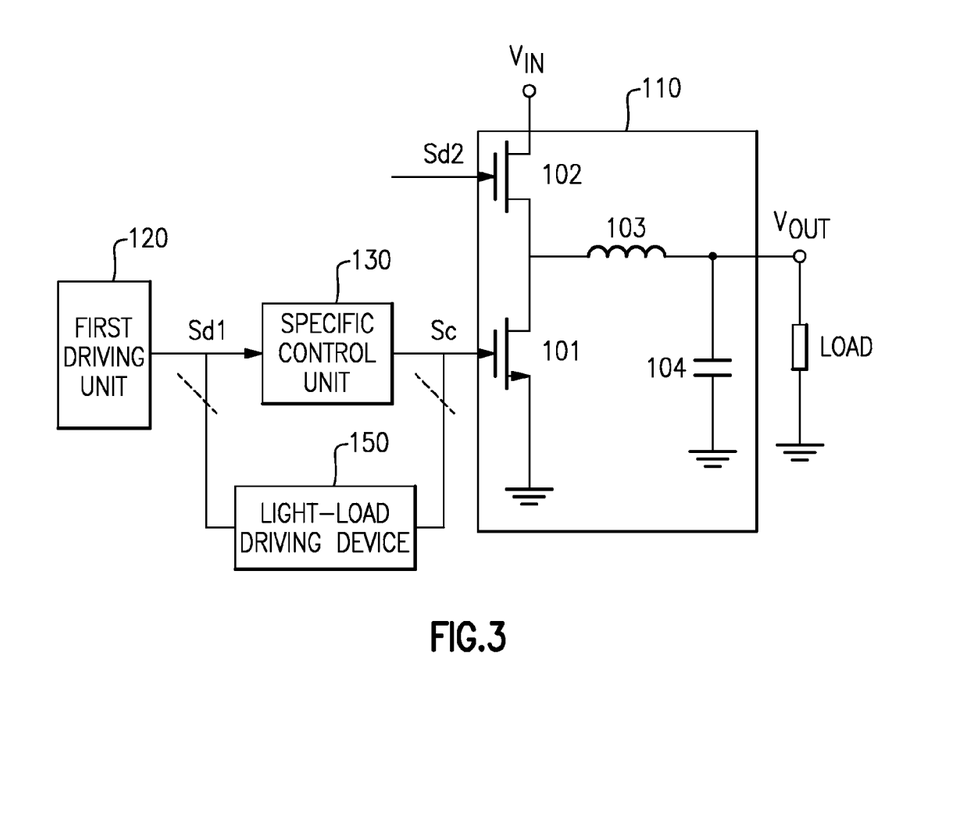
FIG. 3 is a schematic diagram which illustrates the connection of the light-load driving device of the present application in the voltage converter of FIG. 1.

FIG. 3 is a schematic diagram which illustrates the connection of the light-load driving device of the present application in the voltage converter of FIG. 1. FIG. 3 adopts the same reference numbers to generally denote the same or similar parts in FIG. 1. Different from FIG. 1, a light-load driving device 150 is added in FIG. 3. The light-load driving device 150 can determine whether the voltage converter is under the light-load state, generate a discontinuous conduction signal DCS for indicating whether the voltage converter is disabled when the voltage converter is under the light-load state, stop the specific control unit 130 in accordance with the discontinuous conduction signal DCS, and generate a light-load driving signal on the basis of the first basic driving signal Sd1 to drive the control element in the voltage converting unit 110 so as to reduce the power consumption therein, thereby optimizing the performance of the voltage converter 100 by using proper driving signal according to the load of the voltage converter. If the triode 102 (i.e., another control element) in the voltage converting unit 110 in the FIG. 3 is driven by another specific driving unit, another light-load driving device can be adopted to generate a light-load driving signal with respect to the triode 102; the triode 102 is driven by using the light-load driving signal under the light-load state, so as to reduce the power consumption of the triode 102 under the light-load state.

Figure 4:
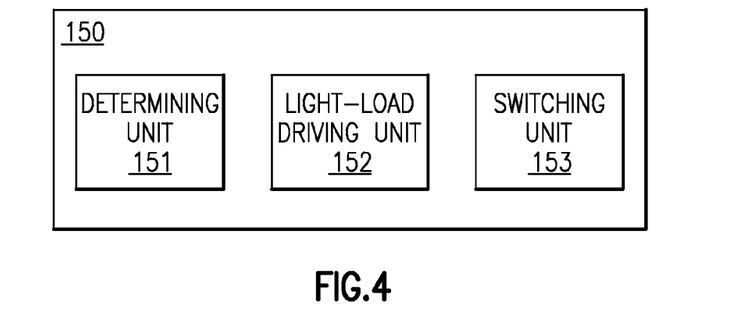
FIG. 4 is a block diagram which schematically illustrates the light-load driving device in FIG. 3.

FIG. 4 is a block diagram which schematically illustrates the light-load driving device 130 in FIG. 3. The light-load driving device 150 can be applied to the voltage converter 100 depicted in FIG. 1. As shown in FIG. 4, the light-load driving device 150 includes: a determining unit 151, for determining whether the voltage converter is under the light-load state, and generates a discontinuous conduction signal DCS to indicate whether the voltage converter is disabled when the voltage converter is under the light-load state; a light-load driving unit 152, which can generate a light-load driving signal based on the basic driving signal of the control element (e.g., the triode 101 in FIG. 1) in the voltage converter, wherein the light-load driving signal is able to reduce the power consumption of the voltage converter under the light-load state; a switching unit 153, for providing the first basic driving signal to the light-load driving unit 152 when the discontinuous conduction signal DCS indicates that the voltage converter is disabled, and replacing the specific driving signal Sc with the light-load driving signal to drive the control element. The switching unit 153 also can provide the first basic driving signal to the specific control unit 130 when the discontinuous conduction signal DCS indicates that the voltage converter is enabled, and replace the light-load driving signal with the specific driving signal Sc to drive the control element.

The determining unit 151, for example, can receive load state information from the electronic module (i.e. load) powered by the voltage converter 100, determine whether the voltage converter is under the light-load state according to the received load state information, and generate the discontinuous conduction signal DCS. When the voltage converter is under the light-load state, the discontinuous conduction signal can be generated according to a value of the load (i.e. load value). For example, when the discontinuous conduction signal disables the voltage converter periodically, the smaller the load value in the light-load state is, the longer the lasting time of disabling the voltage converter in the discontinuous conduction signal is; the greater the load value in the light-load state is, the shorter the lasting time of disabling the voltage converter in the discontinuous conduction signal is. Alternatively, the determining unit 151 further can determine whether the voltage converter is under the light-load state according to the operating state of the voltage converter 100. For example, in the buck converting unit 110 as shown in FIG. 1, the determining unit 151 can determine whether the voltage converter is under the light-load state when the output voltage Vout is greater than the reference voltage; when the voltage converter is under the light-load state, the discontinuous conduction signal for indicating that the voltage converter is disabled is generated if the triodes 101 and 102 in the buck converting unit are turned off, so that the switching unit is switched to drive the control element with the light-load driving signal; if any one of the triodes 101 and 102 is not turned off, the discontinuous conduction signal for indicating that the voltage converter is enabled is generated, so that the switching unit is switched to drive the control element with the specific driving signal. The specific method of determining the load state by the determining unit 151 will not limit the present application.

The light-load driving unit 152 can generate the light-load driving signal by proper methods in view of the reason that the control element generates power consumption under the light-load state, so as to reduce the power consumption of the control element under the light-load state. For example, when unnecessary power consumption of the control element under the light-load state is caused by high level of its driving signal, the level of the driving signal of the control element should be decreased; when the unnecessary power consumption of the control element under the light-load state is caused by fluctuation of the driving signal, a smoother driving signal is provided. The basic driving signal of the control element is a given signal in the voltage converter, and the light-load driving unit 152 can more conveniently generate the light-load driving signal by using the basic driving signal. For example, when there are excessive power consumptions in the control element since the specific control unit 130 increases the low level of the first basic driving signal Sd1, the light-load driving unit 152 under the light-load state can directly use the first basic driving signal Sd1 as the light-load driving signal of the control element, or a high level signal is inverted by a inverter so as to generate a low level signal which is more approximate to zero, thereby reducing the power consumption of the control element under the light-load state.

When the discontinuous conduction signal indicates that the voltage converter is disabled, the switching unit 153 provides the first basic driving signal to the light-load driving unit 152, and replaces the specific driving signal Sc with the light-load driving signal to drive the control element.

Figure 5:
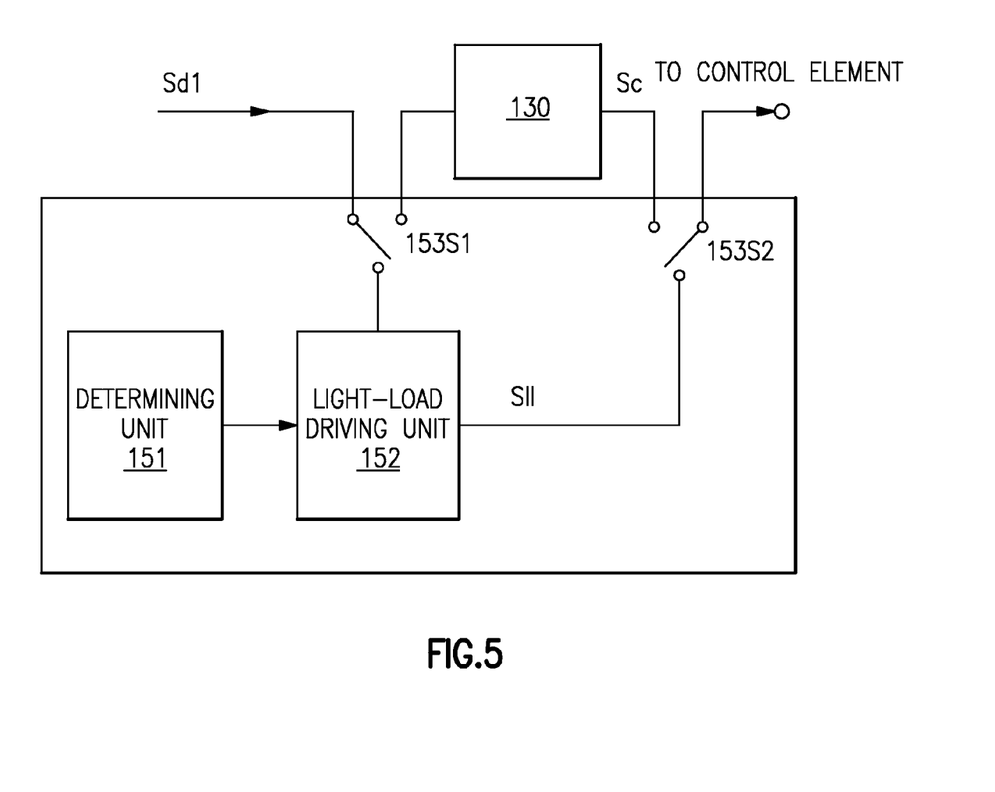
FIG. 5 schematically illustrates a connection relationship of a control unit in the light-load driving device of the present application.

FIG. 5 schematically illustrates a connection relationship of the switching unit 153 in the light-load driving device 150 of the present application. As shown in FIG. 5, the switching unit 153 comprises: a first switch 153S1, for providing the first basic driving signal Sd1 to the light-load driving unit 152 when the discontinuous conduction signal indicates that the voltage converter is disabled, and providing the first basic driving signal Sd1 to the specific control unit 130 when the discontinuous conduction signal indicates that the voltage converter is enabled; a second switch 153S2, for providing an output of the light-load driving unit 152 to the control element when the discontinuous conduction signal indicates that the voltage converter is disabled, and providing the output of the specific control unit 130 to the control element when the discontinuous conduction signal indicates that the voltage converter is enabled. The first switch 153S1 can be a single-pole double-throw switch, or two independent 1×1 switches; similarly, the second switch 153S2 can be a single-pole double-throw switch, or two independent 1×1 switches.

It is shown above that in one or more technical solutions of this application, the specific driving signal for the control element can be replaced with the light-load driving signal so as to reduce the power consumption in the control element when the voltage converter operates discontinuously under the light-load state, thereby optimizing the performance of the voltage converter by using the proper driving signal according to the load of the voltage converter.

Figure 6:
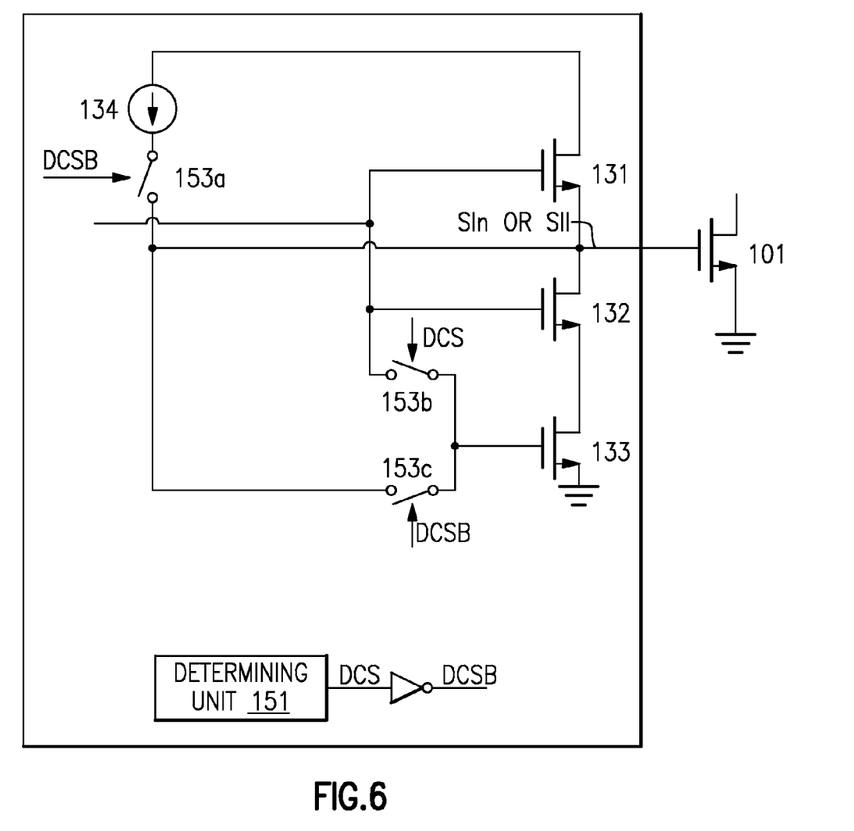
FIG. 6 illustrates a schematic circuit diagram of the light-load driving device of the present application implemented based on the low-noise control unit in FIG. 2.

FIG. 6 illustrates a schematic circuit diagram of the light-load driving device of the present application implemented based on the low-noise control unit in FIG. 2. Shown as FIG. 6, switches 153a, 153b, 153c are added in the low-noise control unit in FIG. 2; the switches 153a, 153b, 153c jointly form the switching unit 153 in FIG. 4. By using the switching unit 153, when the discontinuous conduction signal DCS of the determining unit 151 indicates that the voltage converter is enabled, the switches operates to change the circuit diagram in FIG. 6 to be the circuit diagram shown in FIG. 2, thereby generating the low-noise driving signal; when the discontinuous conduction signal DCS of the determining unit 151 indicates that the voltage converter is disabled, the light-load driving device employs the triodes 131, 132 and 133 therein to form an inverter; the formed inverter can invert the first basic driving signal to generate a light-load driving signal Sll. The low voltage of the light-load driving signal is lower than the low voltage of the low-noise driving signal, thereby reducing the power consumption of the control element in the voltage converting circuit 110 under the light-load state. In FIG. 6, the light-load driving unit 152 is formed by an existing component in the low-noise control unit, so that cost is saved.

As shown in FIG. 6, one end of the switch 153a is connected to an output end of the current source 134, and the other end thereof is connected to the gate electrode of the triode 133 through the switch 153c; the switch 153a is open when the discontinuous conduction signal DCS of the determining unit 151 indicates that the voltage converter is disabled while it is closed when the discontinuous conduction signal DCS indicates that the voltage converter is enabled; the switch 153b is situated between the gate electrode of triode 132 and the gate electrode of the triode 133; the switch 153b is turned off when the discontinuous conduction signal DCS of the determining unit 151 indicates that the voltage converter is disabled while it is turned on when the discontinuous conduction signal DCS indicates that the voltage converter is enabled; one end of the switch 153c is connected to the gate electrode of the triode 133, and the other end thereof is connected to the output end of the current source 134 via the switch 153a; the switch 153c is open when the discontinuous conduction signal DCS of the determining unit 151 indicates that the voltage converter is disabled while it is closed when the discontinuous conduction signal DCS indicates that the voltage converter is enabled.

The switches 153a, 153b, and 153c can be controlled as below. The discontinuous conduction signal DCS generated by the determining unit 151 is inverted, to generate an inverted discontinuous conduction signal (DCSB); the switches 153a and 153c are controlled by the inverted discontinuous conduction signal DCSB, and the switch 153b is controlled by the discontinuous conduction signal DCS.

When the discontinuous conduction signal DCS of the determining unit 151 indicates that the voltage converter is enabled, the switches 153a and 153c are closed, and the switch 153b is open; the circuit diagram in the FIG. 6 is equivalent to that in FIG. 2, and low-noise driving signal (i.e., Sln) is generated on the basis of the first basic driving signal Sd1; when the discontinuous conduction signal DCS of the determining part 151 indicates that the voltage converter is disabled, the switches 153a and 153c are open, and the switch 153b is closed, the triodes 131, 132 and 133 form an inverter; the inverter inverts the first basic driving signal Sd1 to generate the light-load driving signal Sll. The low voltage of the light-load driving signal is lower than the low voltage of the low-noise driving signal, thereby reducing the power consumption of the control element of the voltage converting circuit 110 under the light-load state.

Figure 7:
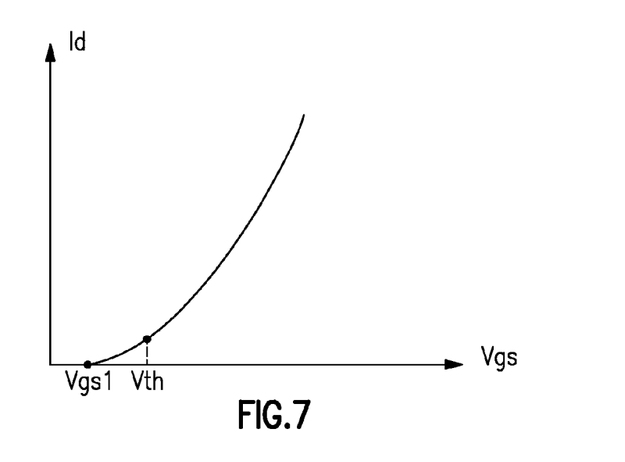
FIG. 7 illustrates a schematic diagram of the relationship between a gate-source electrode voltage Vgs and a drain current Id when a triode 101 is of a NMOS transistor.

With reference now to FIG. 7, the principle of reducing its power consumption through reducing gate electrode voltage of the triode 101 is described. FIG. 7 illustrates a schematic diagram of the relationship between a gate-source electrode voltage Vgs and a drain current Id when a triode 101 is of a NMOS transistor.

In FIG. 7, a horizontal axis is the gate-source electrode voltage Vgs of the triode 101, and a longitudinal axis is the drain electrode current Id of the triode 101. Since the source electrode of the triode 101 is grounded, the gate-source electrode voltage of the triode 101 is equal to the gate electrode voltage, namely, the voltage of its driving signal Sc or Sll. Vth in FIG. 7 is a threshold voltage of the triode 101; when the gate-source electrode voltage Vgs is more than Vth, the triode 101 is turned on; when it is less than Vth, the triode 101 is turned off. When the triode 101 is driven by the specific control signal (e.g., the low-noise driving signal Sln generated by the light-load driving device in FIG. 6) generated by the specific control unit 130, the low level of the low-noise driving signal Sln is between Vgsl and Vth in FIG. 7, and is used for reducing the noise in the output voltage Vout of the voltage converter; when the triode 101 is driven by the light-load driving signal Sll, the low level of the light-load driving signal Sll is less than Vgsl in FIG. 7, thus the drain electrode current Id in the triode 101 is greatly reduced, and the power consumption of the triode 101 under the light-load state is lowered. When the triode 101 is of a different type, the graphical representation of FIG. 7 can be properly modified. For example, when the triode 101 is of a PMOS type, the horizontal axis in FIG. 7 can be replaced with the source-gate electrode voltage Vsg.

Figure 8:
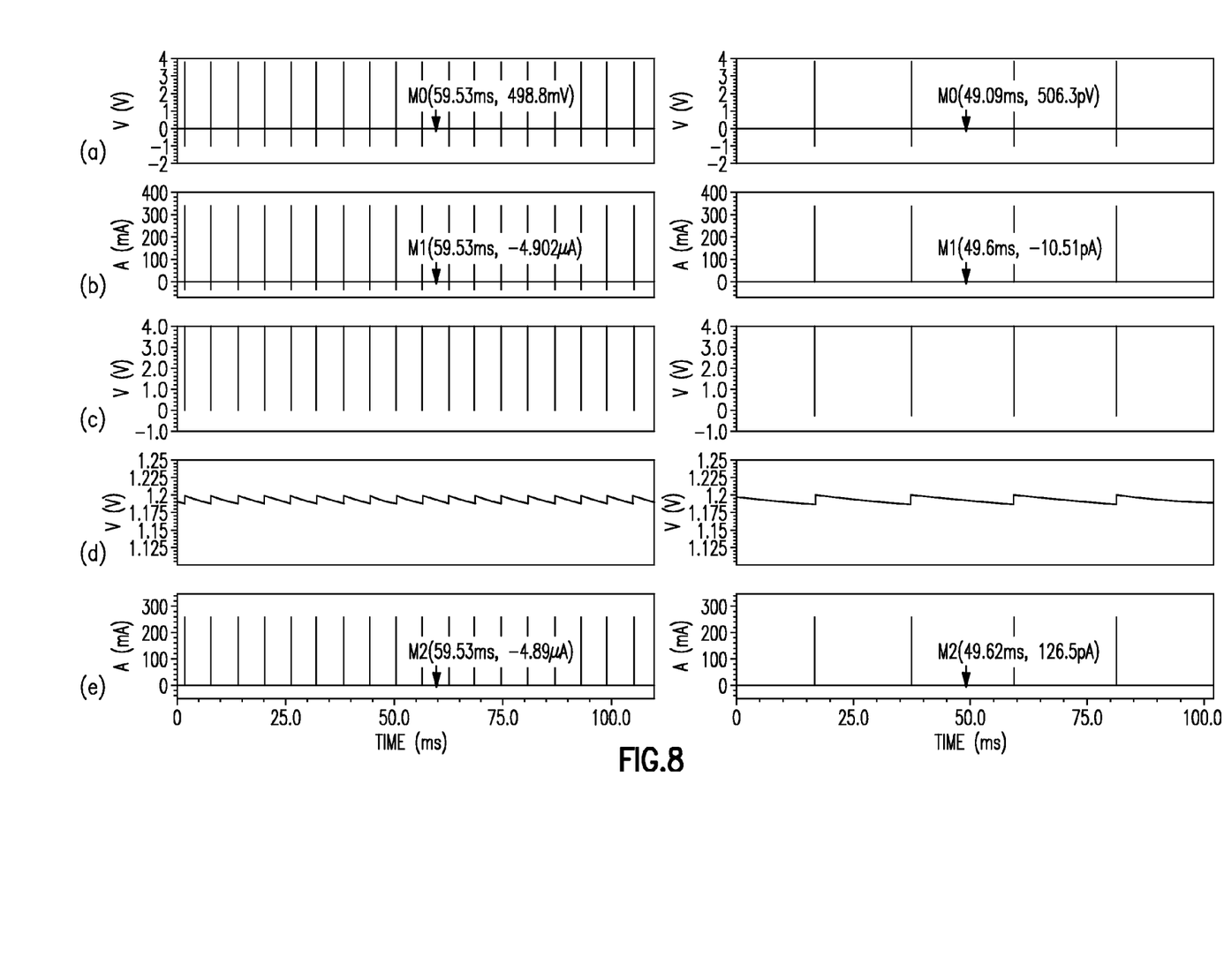
FIG. 8 illustrates a simulation result of applying the light-load driving device in FIG. 6 to the voltage converter.

FIG. 8 illustrates the simulation result of applying the light-load driving device in FIG. 6 to the voltage converter. It is assumed that load of the voltage converter is zero, and its input voltage is 3.8V. In FIG. 8, the panels on the left side show the simulation result of taking circuit in FIG. 6 as the low-noise control unit by the switching unit 153 when the voltage converter is under the light-load state; and the panels on the right side show the simulation result of taking circuit in FIG. 6 as the light-load driving unit by the switching unit 153 when the voltage converter is under the light-load state.

In the left and right panels of FIG. 8, the horizontal axis represents time, and the longitudinal axis of FIG. 8(a) represents the gate electrode voltage of the triode 101; the longitudinal axis of FIG. 8(b) is the drain electrode current of the triode 101; the longitudinal axis of FIG. 8(c) is the discontinuous conduction signal DCS of the voltage converter 100, wherein when the discontinuous conduction signal DCS is low, the voltage converter is used for performing the charging and discharging operations; when the discontinuous conduction signal DCS is high, the voltage converter is disabled, and the charging and discharging operations are stopped; the longitudinal axis of FIG. 8(d) is the output voltage Vout of the voltage converter; the longitudinal axis of FIG. 8(e) is current on the inductor in the voltage converter of FIG. 3. Since the load of the voltage converter is zero (e.g., the voltage converter is under the light-load state), the voltage converter does not carry out the charging and discharging operations under an ideal condition; however, since there is power consumption in the control element of the voltage converter, the discontinuous conduction signal DCS will become low after a period of time, thus the charging and discharging operations are carried out.

The simulation result of the panels on the left side of the FIG. 8 shows that when the discontinuous conduction signal DCS is high, and no charging and discharging operations are carried out in the voltage converter, the gate electrode voltage of the triode 101 upon driven by the specific control unit is 498.8 mV (micro volt) (see the voltage value at point M0 on the left side panel of FIG. 8(a)); the gate electrode voltage of the triode 101 upon driven by the light-load driving device 150 is 506.3 pV (pico volt) (see the voltage value at point M0 on the right side panel of FIG. 8(a)), the gate electrode voltage of the triode 101 is greatly reduced. Correspondingly, the drain electrode current of the triode 101 is reduced from 4.902 µA at the point M1 of the left panel of FIG. 8(b) to 10.51 pA at the point M1 of the right panel of FIG. 8(b); the charging and discharging operations executed in the voltage converter are also reduced, which can be seen from lower low level of the DCS signal on the right side in FIG. 8(c); current on the inductor 103 in the voltage converter is also reduced from 4.89 µA at the point M2 on the left side to 126.5 pA at the point M2 on the right side (refer to FIG. 8(e)). It can be seen that, when the voltage converter is disabled under the light-load state, the specific driving signal is replaced with the light-load driving signal to drive the control element (the triode 101), thus the power consumption of the voltage converter in the light-load state is reduced, and performance of the voltage converter is optimized by using proper driving signal according to the load of the voltage converter.

Figure 9:
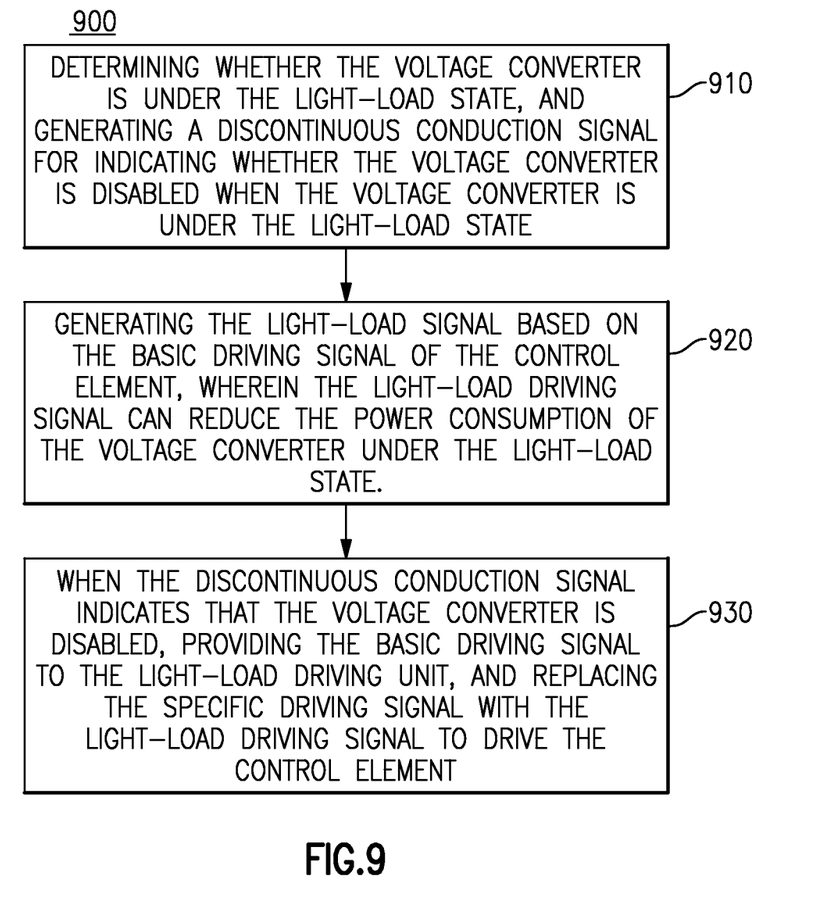
FIG. 9 illustrates a flow diagram of a light-load driving method applied to the voltage converter of the present application.

FIG. 9 illustrates a flow diagram of a light-load driving method 900 applied to the voltage converter in the present application. The light-load driving method 900 can be applied to the voltage converters as depicted in view of FIG. 1 and FIG. 2, and can be applied to other converters including a boost converter, a buck converter, and a boost-buck converter and the like; the voltage converter includes: a voltage converting circuit, which comprises a control element, and the control element controls the charging and discharging operations of the voltage converting circuit upon driven by the specific control signal Sc; a first driving unit, for generating a first basic driving signal, wherein the first basic driving signal drives the control element to perform a basic control operation; a specific control unit, for adjusting the first basic driving signal and generating a specific driving signal, wherein the specific driving signal is used for driving the control element so that the voltage converting circuit has specific performance.

As shown in FIG. 9, the light-load driving method 900 may include steps of: determining whether the voltage converter is under the light-load state, and generating the discontinuous conduction signal for indicating whether the voltage converter is disabled when the voltage converter is under the light-load state (S910); generating the light-load driving signal on the basis of the basic driving signal of the control element, wherein the light-load driving signal can reduce the power consumption of the voltage converter under the light-load state (S920); when the discontinuous conduction signal indicates that the voltage converter is disabled, providing the basic driving signal to the light-load driving unit, and replacing the specific driving signal with the light-load driving signal to drive the control element (S930).

In S910, the load state information may be received from the electronic module (or load) powered by the voltage converter, and whether the voltage converter is under the light-load state can be determined on the basis of the received load state information; when the voltage converter is under the light-load state, the discontinuous conduction signal is generated according to a load value. Alternatively, in S910, whether the voltage converter is under the light-load state can be determined on the basis of the operating state of the voltage converter, and the discontinuous conduction signal is generated. For example, whether the voltage converter is under the light-load state can be determined in the buck converting unit shown in FIG. 1 when the output voltage Vout of the voltage converter is greater than a predetermined reference voltage (the reference voltage corresponds to the expected output voltage); when the voltage converter is under the light-load state, the discontinuous conduction signal for indicating that the voltage converter is disabled is generated in case that the triodes 101 and 102 in the buck converting unit are turned off, so as to drive the control element by the light-load driving unit; if any one of the triodes 101 and 102 is not turned off, the discontinuous conduction signal for indicating that the voltage converter is enabled is generated, so that the control element is driven by the specific driving signal.

In S920, the light-load driving signal is generated by methods in view of the reason that the control element generates power consumption under the light-load state, so as to reduce the power consumption of the control element under the light-load state. For example, when unnecessary power consumption of the control element under the light-load state is caused by too high level of its driving signal, the level of the driving signal of the control element is reduced in S920; when the unnecessary power consumption of the control element under the light-load state is caused by fluctuation of the driving signal, a smoother driving signal is provided in the S920. The basic driving signal of the control element is a given signal in the voltage converter, the light-load driving unit 152 can more conveniently generate the light-load driving signal on the basis of the basic driving signal.

As an example, when the control element is a NMOS transistor, if the control element has excessive power consumption in the specific control unit because the voltage converter increases the low level of the first basic driving signal, the first basic driving signal can be used as the light-load driving signal of the control element in S920, thereby reducing the power consumption of the control element under the light-load state. Alternatively, the light-load driving signal can be generated by using the existing component in the specific control unit of the voltage converter, thus it saves cost greatly and is convenient to control; the specific example can be referred to the descriptions about the triodes 131, 132 and 133 in FIG. 6.

In S930, when the discontinuous conduction signal indicates that the voltage converter is disabled, the light-load driving signal is provided to the control element by using the switch, and the specific driving signal is prohibited. Specific implementation of the switch is described herein in reference to the switches 153S1 and 153S2 in FIG. 5. In a case where the light-load driving signal is generated by using the component in the specific control unit, a control can be carried out by using the specific component in the specific control unit as described in reference to the switches 153a, 153*b* and 153*c* in FIG. 6. When the discontinuous conduction signal indicates that the voltage converter is enabled, the basic driving signal can be provided to the specific control unit, and the light-load driving signal is replaced with the specific driving signal to drive the control element.

In the technical solution of the light-load driving method 900 of the present application, the specific driving signal of the control element is replaced with the light-load driving signal to reduce the power consumption in the control element when the voltage converter is disabled under the light-load state, thus the performance of the voltage converter can be optimized by using driving signal according to load of the voltage converter.

In the various examples described herein, references are made to triodes. It will be understood that such triodes can include transistors such as field-effect transistors (FETs). Such FETs can include, for example, MOSFET devices and/or transistors implemented in other process technologies. Other types of transistors can be utilized to implement one or more features of the present disclosure.

A person of ordinary skill in the art can understand that the specific implementation of the method embodiment as described above can be referred to the corresponding process in the aforesaid product embodiment, the details are omitted here for convenient and simple description.

A person of ordinary skill in the art can appreciate that components and process steps of respective examples described in conjunction with the embodiments disclosed herein can be implemented by electronic hardware, or a combination of electronic hardware and software. A person of ordinary skill in the art can achieve the described functions by using different methods for each specific application, but such achievement should not go beyond the scope of the present application.

The principle and advantages of the technical solution described above can be applied to any voltage converter. The voltage converter may be applied to various electronic apparatuses. The electronic apparatuses include but not limited to electronic products and parts of electronic products, electronic testers, etc. The consumer electronic products may include but not limited to smart phone, television, tablet computer, display, personal digital assistant, camera, audio player, memory, etc. Parts of the consumer electronic products may include a multi-chip module, a power amplifier module, a voltage converter, etc.

The above described are specific embodiments of the present application only, the scope of the present application is not limited thereto, and any person skilled in the art can easily think of changes or replacements within the disclosed technical scope of the present application, which should be covered in the protection scope of the present application.

What is claimed is:

1. A control system for a voltage converter, comprising:
a determining unit configured to determine whether the voltage converter is in a first load state or a second load state, the first load state including a light-load state or a disabled state, the second load state including a non-light-load state or an enabled state;
a driving circuit in communication with the determining unit and configured to generate a first driving signal when the voltage converter is in the first load state, and to generate a second driving signal when the voltage converter is in the second load state; and
a switching circuit implemented as part of the driving circuit and configured such that the driving circuit generates the first driving signal when the voltage converter is in the first load state, and such that the driving circuit generates the second driving signal as a low-noise driving signal when the voltage converter is in the second load state, the switching circuit further configured to form the driving circuit as an inverter such that the first driving signal has a low voltage that is lower than a low voltage of the low-noise driving signal.

2. The control system of claim 1 wherein the driving circuit includes a first transistor implemented as a PMOS device, a second transistor implemented as an NMOS device, and a third transistor implemented as an NMOS device, arranged in series between a voltage node and a ground, the driving circuit further including a current source having an input coupled to the voltage node, a source of the first transistor connected to the input of the current source, a drain of the first transistor connected to a drain of the second transistor, a source of the second transistor connected to a drain of the third transistor, each gate of the first and second transistors connected to an input node for receiving an input driving signal, the drain of the first transistor connected to an output node for the first or second driving signal.

3. The control system of claim 2 wherein the switching circuit includes a first switch, a second switch, and a third switch, the first switch implemented between an output of the current source and the output node, the second switch implemented between the output node and a gate of the third transistor, and the third switch implemented between the input node and the gate of the third transistor.

4. A method for controlling a voltage converter, the method comprising:
determining whether the voltage converter is in a first load state or a second load state, the first load state including a light-load state or a disabled state, the second load state including a non-light-load state or an enabled state; and
generating a first driving signal when the voltage converter is in the first load state or generating a second driving signal when the voltage converter is in the second load state, the generating including performing a plurality of switching operations such that the first driving signal is generated when the voltage converter is in the first load state, and such that the second driving signal is generated as a low-noise driving signal when the voltage converter is in the second load state, the generating further including performing an inverter operation such that the first driving signal has a low voltage that is lower than a low voltage of the low-noise driving signal.

5. The method of claim 4 further comprising generating a discontinuous conduction signal indicating whether the voltage converter is enabled or disabled.

6. The method of claim 5 wherein the first driving signal is generated when the discontinuous conduction signal indicates that the voltage converter is disabled, and the second driving signal is generated when the discontinuous conduction signal indicates that the voltage converter is enabled.

7. The method of claim 4 further comprising receiving an input driving signal to generate the first driving signal or the second driving signal.

8. The method of claim 4 wherein the first driving signal is generated for a control element of the voltage converter to provide a reduced power consumption of the control element when the voltage converter is in the first load state.

9. An electronic apparatus comprising:
a power management system configured to provide a supply voltage;

a module configured to provide one or more functionalities for the electronic apparatus by utilizing a regulated voltage based on the supply voltage; and a voltage converter configured to receive the supply voltage and generate the regulated voltage, the voltage converter including a control system having a determining unit configured to determine whether the voltage converter is in a first load state or a second load state, the first load state including a light-load state or a disabled state, the second load state including a non-light-load state or an enabled state, the control system further including a driving circuit in communication with the determining unit and configured to generate a first driving signal when the voltage converter is in the first load state, and to generate a second driving signal when the voltage converter is in the second load state, the control system further including a switching circuit implemented as part of the driving circuit and configured such that the driving circuit generates the first driving signal when the voltage converter is in the first load state, and such that the driving circuit generates the second driving signal as a low-noise driving signal when the voltage converter is in the second load state, the switching circuit further configured to form the driving circuit as an inverter such that the first driving signal has a low voltage that is lower than a low voltage of the low-noise driving signal.

10. The electronic apparatus of claim 9 wherein the electronic apparatus is a portable device powered by a battery.

11. The electronic device of claim 10 wherein the portable device includes a mobile phone, a tablet computer, a display, an eBook reader, or a portable digital media display.

12. The control system of claim 1 further comprising a control element in communication with the driving circuit and configured to facilitate operation of the voltage converter based on the first driving signal or the second driving signal.

13. The electronic device of claim 9 wherein the voltage converter further includes a control element in communication with the driving circuit and configured to facilitate operation of the voltage converter based on the first driving signal or the second driving signal.

* * * * *